United States Patent [19]

Ngai

[11] Patent Number: 5,453,847
[45] Date of Patent: Sep. 26, 1995

[54] LCD FACSIMILE TRANSMISSION

[75] Inventor: T. W. Ngai, Shatin, Hong Kong

[73] Assignee: Motorola, Inc., Schaumburg, Ill.

[21] Appl. No.: 298,086

[22] Filed: Aug. 31, 1994

Related U.S. Application Data

[63] Continuation of Ser. No. 143,771, Nov. 1, 1993, abandoned.

[51] Int. Cl.[6] .................................................. H04N 5/76
[52] U.S. Cl. ................................. 358/451; 358/479
[58] Field of Search ........................... 358/451, 479, 358/482–483, 432–433; 382/47; 348/358, 440, 581–582; 178/18–19; 395/102, 139; 364/715.07, 474.28–474.31

[56] References Cited

U.S. PATENT DOCUMENTS

| | | | |
|---|---|---|---|
| 5,148,295 | 9/1992 | Matsubara | 358/451 |
| 5,159,468 | 10/1992 | Yoshida et al. | 358/451 |
| 5,162,918 | 11/1992 | Muramatsu | 358/451 |
| 5,165,073 | 11/1992 | Shaklee et al. | 358/451 |
| 5,189,529 | 2/1993 | Ishiwata et al. | 358/451 |

*Primary Examiner*—Stephen Brinich
*Attorney, Agent, or Firm*—Harry A. Wolin

[57] ABSTRACT

A system of transmitting computer display information as facsimile pels through conventional facsimile machines. The system comprises a conversion means for scaling each dot of display into facsimile pels using a scaling factor which is used to scale both the width and height of each dot of display. Each dot of display is output as some whole number of facsimile pels. Given that many facsimile machines have no memory, the facsimile pels are temporarily stored as encoded data and output in a steady stream of data bits to the facsimile machine. This frees up the limited memory of the MCU of the pocket size computer.

2 Claims, 2 Drawing Sheets

LCD FACSIMILE TRANSMISSION

This application is a continuation of prior application Ser. No. 08/143,771, filed Nov. 1, 1993, now abandoned.

FIELD OF THE INVENTION

This invention relates in general to facsimile transmission, and more particularly to transmitting information from an LCD (Liquid Crystal Display) display through facsimile transmission means.

BACKGROUND OF THE INVENTION

With the fast paced, mobile conditions prevalent in today's society, people are turning to small, pocket size computer systems to help them organize their time, perform computing functions for small amounts of information, and communicate with others while traveling. The progression of the pocket size computers has gone from the earlier pocket organizers towards personal systems that not only can be used as organizers but allow minor word processing, note taking, and communications, such as paging capabilities.

An essential part of having a personal pocket size computer system is being able to transmit the information from the computer to another location for use by others, transmit the information to a larger computer, or print out the information. Some pocket computers which are manufactured by larger computer makers are generally able to tie to desk top computers through a hard wire link. Others require an additional printer, or even have the printer built in. An additional method of transmitting the information stored within the pocket size computer is to send the information using facsimile machines.

Them are two problems associated with sending information directly from a pocket size computer through a facsimile machine. The first relates to the size of the computer display relative to the facsimile standard output. Generally, pocket size computers use LCD displays having some set amount of dots of information on the screen. On the other hand, the facsimile system will also have some set standard which will not correlate with the LCD display size. A conversion is then required to send the LCD image to a facsimile machine and across the facsimile link to the end party. Distortion in the graphics often occurs because the two are not proportionate, and a closely simulated picture is not received by the end party.

The second problem associated with the LCD display/facsimile machine connection is the rate at which the pocket size computer MCU will transmit data to the facsimile machine. The MCU will usually convert the LCD display dots into facsimile pels (standard facsimile units) and encode the facsimile pels as compressed data at a much faster rate than the facsimile machine can transmit the information over the facsimile link. Large amounts of memory are required to store the encoded data prior to transmitting. For portable computers, and other computers as well, it is desirable to have a minimum amount of RAM memory used for data transmission.

Therefore, it would be advantageous to have a method of converting the information displayed on the screen of a small pocket size computer to a proportional a standard facsimile format and transmit the converted information to a facsimile machine at a rate which the facsimile machine can transmit.

SUMMARY OF THE INVENTION

Briefly stated, the present invention relates to a facsimile system in a computer system having an MCU and an LCD display. Each of the dots of information displayed on the LCD (such as text or graphics, including information written directly to the LCD display by hand) is converted into facsimile pels (standard facsimile units) and transmitted to conventional facsimile machines. The system comprises a conversion means for scaling each dot of LCD display into facsimile pels using a scaling factor which is used to scale both the width and height of each dot of LCD display. Each dot of LCD display is output as some whole number of facsimile pels. Given that many facsimile machines have no memory, the facsimile pels are temporarily stored as encoded data and output in a steady stream of data bits to the facsimile machine. This frees up the limited memory of the MCU of the pocket size computer.

DETAILED DESCRIPTION OF THE PREFERRED EMBODIMENT

Figure 1:
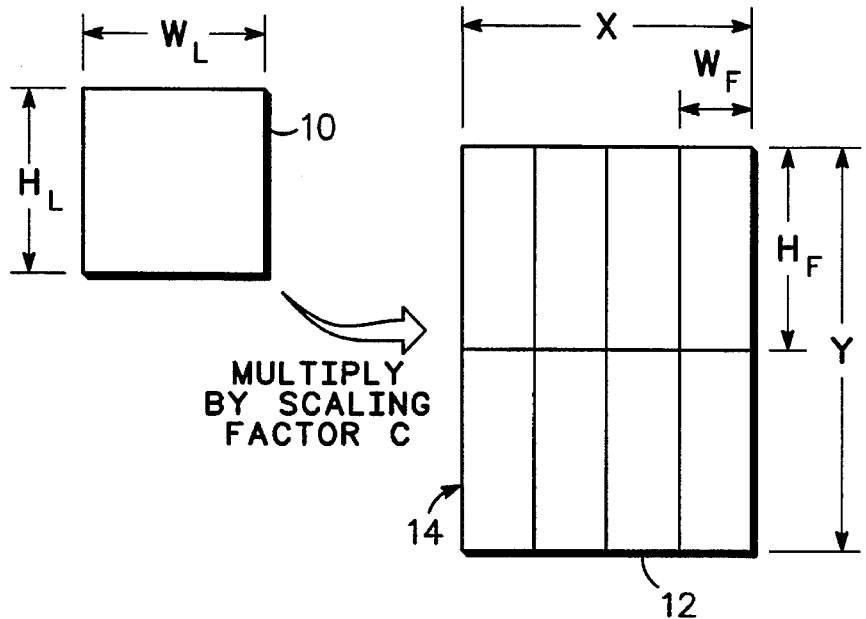
FIG. 1 is a diagram of a dot of LCD image converted to a facsimile configuration according to the present invention.

The present invention relates to communicating information generated and/or processed within a small, portable computer, and transmitting this information by means of convention facsimile transmissions. It should be noted that although the preferred embodiment of the present invention relates to small, pocket size computers, the invention can be used equally as well with other computer systems as needed.

Most pocket size computers utilize LCD display screens as a window for viewing the MCU information. As is commonly understood, an LCD display screen will have a defined width and height and comprises dots which when electronically activated, illuminate an image showing the information. In order to transmit the dots of information from the LCD screen by facsimile means, the dots must be converted into standard facsimile modes. Facsimiles have standard formats by which they will transmit information along conventional transmission modes such as land based phone lines or via radio waves to a receiver, and these formats differ from those of the computer.

In addition, facsimile machines are only able to transmit information at set speeds. Therefore, in order for the computer to transmit information which is displayed on the LCD screen through the facsimile machine to some receiver, the MCU must first convert the LCD dots into standard facsimile format, and then feed the information into the facsimile machine at a rate which the facsimile machine is able to transmit. For purposes of explaining the present invention, the assumption is made that the facsimile machine is not equipped with much memory, requiring some means of controlling the rate of the data stream from the MCU to the facsimile modem.

Facsimile Pel Conversion

To convert the LCD display into data transmitted by fax, the dimensions of both the facsimile standard and the LCD display must be known. Those familiar with facsimile machines will recognize that a unit of facsimile is labeled as a pel of facsimile. The width/height of a pel of facsimile depends upon the standard being used. For instance, according to the T4 standard resolution for A4 paper, the number of pels in 215 mm width of A4 paper is 1728 pels yielding a pel width of 0.124 mm. The number of pels in 1 mm of height for A4 paper is 3.85 for a pel height of 0.26 mm.

The individual unit for an LCD display is a dot of display. The LCD display screens will be n dots wide and m dots high, with n and m dependent upon the size of the LCD screen. Knowing the width and height of the LCD display screen and the number of dots per width/height, or n and m respectively, the size of the dot can also be determined. For instance, if the width of the LCD display screen is 115 mm and there are 320 dots in that width, the width of one dot of LCD display can be determined as 115 mm/320 dots=0.36 mm per dot. Taking a 52.5 mm high LCD display with 146 dots, the height will also be 0.36 mm per dot (space between the dots also taken into consideration).

Using the T4 standard resolution for A4 paper for a facsimile, and considering an LCD dot of 0.36 mm square, one recognizes that distortion will occur transmitting the LCD dot directly through the facsimile machine on a one-dot-to-one-pel basis. Accordingly, for non-distorted information to be faxed to a receiver, a conversion must take place wherein one dot of LCD display is converted to some whole number of facsimile pels. In other words, one must determine how many pels are needed such that combining some number of pels would give a width and height proportional to the width and height of the dot of LCD display.

FIG. 1 visually shows the concept of converting the dot of LCD display into some number of facsimile pels. Specifically, a dot of LCD display 10 having a width WL and a height HL is converted using a scaling factor c into a scaled dot of LCD display 12 having some whole number of fax pels 14. The scaled dot of LCD display 12 has a total number of pels X(Y). Each fax pel 14 has a width WF and a height $H_F$.

The scaling factor c is the factor for scaling both width and height. Accordingly, the equations used to relate a dot of LCD display 10 to scaled dot of LCD display 12 are:

$$(W_F)X = c(W_L) \quad (1)$$

and $$(H_F)Y = c(H_L) \quad (2)$$

Using the examples mentioned above with a T4 standard resolution for A4 paper and an LCD display dimension of 115 mm by 52.5 mm gives the following:
$W_L$=0.36 mm $W_F$=0.124 mm $H_L$=0.36 mm $H_F$=0.26 mm Substituting into equations 1) and 2) yields:

.124X=.36 c

.26Y=.36c having 3 variables. Eliminating c from the equations gives X/Y-2.09 or 2. At this point, visual inspection is required to choose an X to Y ratio which is acceptable. In this example, X is chosen as 4 resulting in Y=2. Solving for c results in c=1.4. This scaling factor is now used with all dots to convert them to fax format, both in the vertical and horizontal dimensions.

With the scaling factor computed, the MCU is able to quickly convert all dots of LCD display 10 into scaled dots of LCD display 12, and the scaled dots are then encoded into compressed data for transmission. In fact, the MCU can process the display information at a rate much faster than the facsimile machine is able to transmit the information to the receiver end. Under the assumption that the facsimile machine is also portable with no memory and little memory is used in the host computer for buffering the compressed data, the flow of data from the MCU to the facsimile machine must be controlled to allow a steady stream of data at a speed acceptable to the facsimile machine.

Data Stream Control

Figure 2:
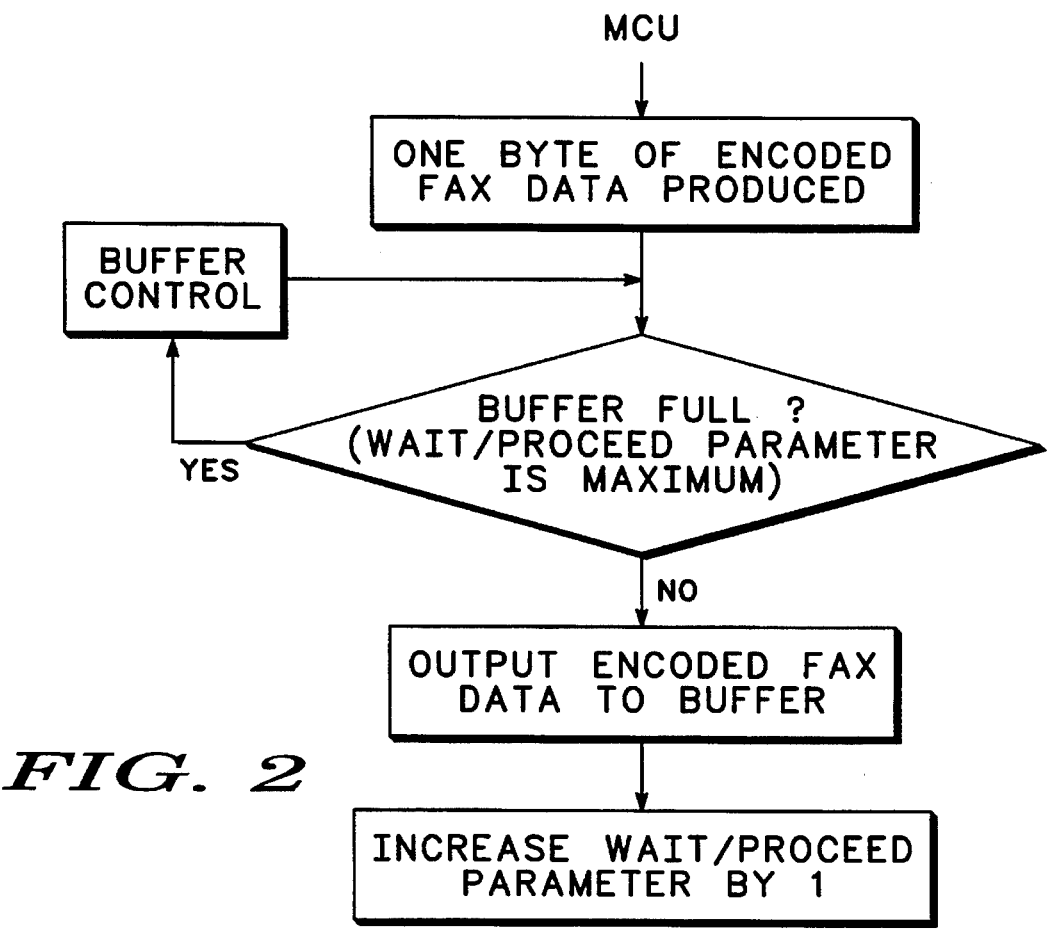
FIG. 2 shows a flow chart representing the input of data into a buffer to control the feed of converted data to a facsimile machine according to the present invention.

FIG. 2 shows the method through which the stream of information is transmitted to the facsimile machine according to the present invention and in its preferred embodiment. First, the MCU produces a byte of data for transmitting to the facsimile machine, which data is to be temporarily stored in a buffer. In the preferred embodiment the buffer is a circular buffer. Prior to sending the data to the buffer, a buffer control unit checks to see if the buffer is already full. Specifically, the buffer is assigned a wait/proceed parameter which is initially set at zero and is increased by one each time additional data is transmitted to the buffer from the MCU. The wait/proceed parameter has a maximum number representing the maximum buffer count, and each time the MCU is ready to send additional data, the buffer control checks to see if the wait/proceed parameter is less than the maximum buffer count. If so, the data from the MCU is stored into the buffer and the wait/proceed parameter is increased by 1. If not, the buffer control instructs the MCU to stop processing and wait until the buffer has available memory space.

Figure 3:
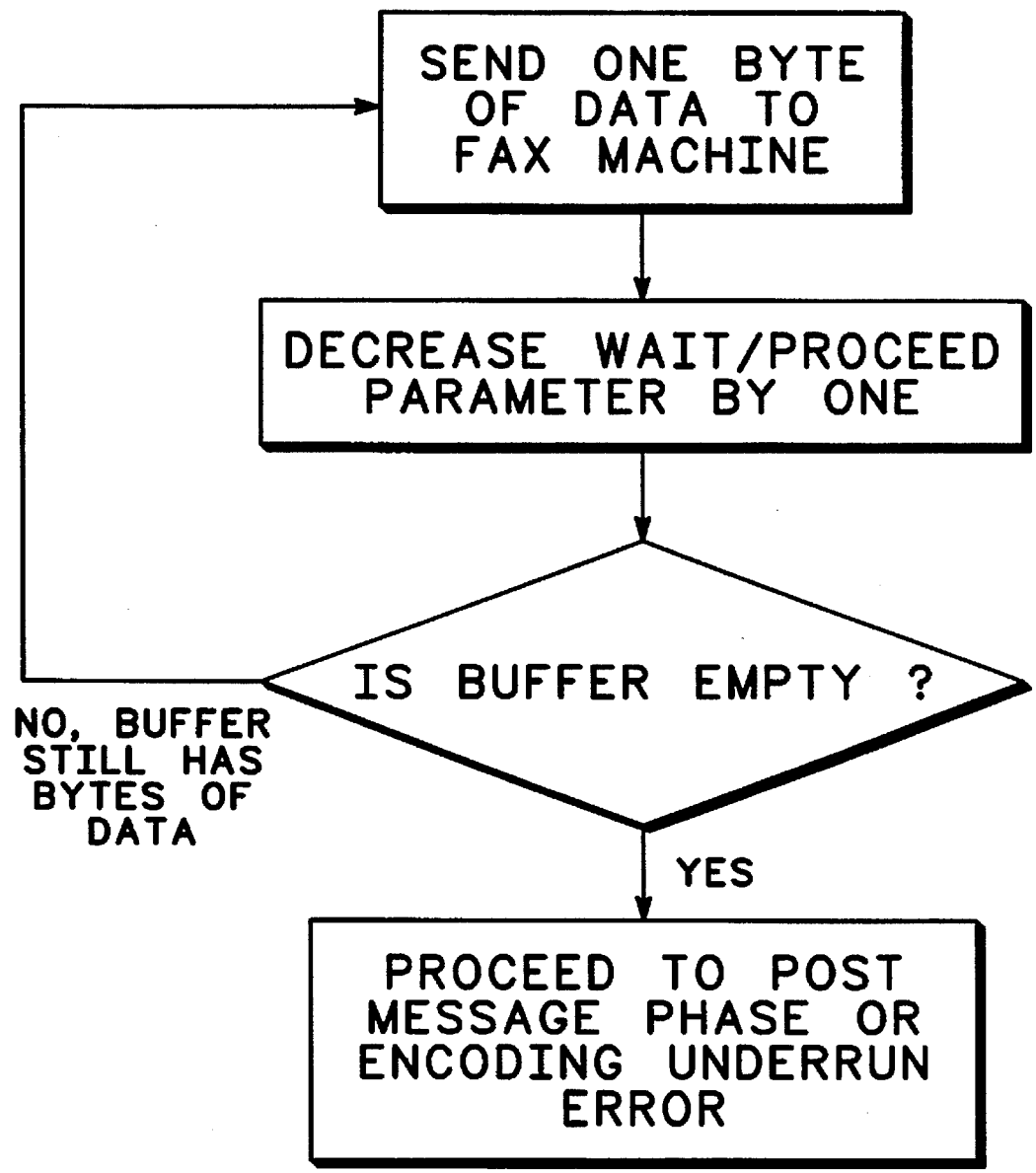
FIG. 3 shows a flow chart representing the output of data from the buffer to the facsimile machine according to the present invention.

At the same time that the buffer control is controlling the information into the buffer, data is transmitted from the buffer to the facsimile machine at a constant rate. As shown in FIG. 3, each time data is sent from the buffer to the facsimile machine, the wait/proceed parameter is decreased by 1. If the wait/proceed parameter is zero, the MCU will proceed to a post message phase, or an encoding underrun error occurs and the facsimile procedure is terminated.

The present invention has been described for use with a computer using an LCD display. It is understood that displays other than LCD displays can, and will be, used with small pocket size computers, particularly as technology for displays increase. The same problem of proportioning the facsimile output and controlling the stream of information to the facsimile machine applies equally to other displays as it does to LCD displays. Accordingly, the present invention extends to any display used with small pocket size computers. A unit of the computer display would be defined to find the conversion factor c, and the method of converting and transmitting is the same.

It is also understood that there may be distortion of an image generated by any size computer or display and transmitted to a second source where the two may be of varying dimensions. The method of converting an individual unit of the display into a proportional facsimile unit would apply. Therefore, the present invention applies to any display where the display would be distorted by transmitting the image on the display.

By using the methods of the present invention to scale the LCD information dots, or display screens as the case may be, and control their feed into the facsimile machine, a logical and efficient method of transmitting display via facsimile means is found. This method allows the use of small portable facsimile machines in conjunction with small pocket size computers.

I claim:

1. In a computer system having an MCU and an LCD display where dots of information displayed on the LCD, such as text or graphics, including information written directly to the LCD display by hand, are to be transmitted through facsimile transmission means, a method of transmitting the dots of LCD displayed information through facsimile machines comprising the steps of:

converting each of the dots of LCD display into facsimile pels using a scaling factor which is used to scale both the width and the height of each of the dots of LCD display, each of the dots of LCD display converted into some whole number of facsimile pels;

converting the facsimile pels into compressed data;

transmitting the compressed data to a buffer;

assigning a wait/proceed parameter to track the storage availability of the buffer;

checking the wait/proceed parameter to assure there is memory space within the buffer before the converter sends the compressed data to the buffer;

continuously transmitting the compressed data to the buffer when the wait/proceed parameter indicates that the buffer has available memory locations, the transmission continuing speed at which the dots of LCD display can be converted;

stopping the flow of the compressed data when the wait/proceed parameter indicates the buffer is full, and continuing the transmission when the wait/proceed parameter indicates open memory locations;

continuously transmitting the compressed data from the buffer to the facsimile machine while the buffer has compressed data stored in it, the speed at which the compressed data are transmitted from the buffer to the facsimile machine not exceeding the facsimile machine's maximum transmission rate;

proceeding to a post-message phase when the wait/proceed parameter registers no more compressed data stored in the buffer; and transmitting the compressed data to a designated receive station.

2. In a computer system having an MCU and a display where dots of information displayed, such as text or graphics, are to be transmitted through facsimile transmission means, a method of transmitting the dots of displayed information through facsimile machines comprising the steps of:

converting each of the dots of display into facsimile pels using a scaling factor which is used to scale both the width and the height of each of the dots of display, each of the dots of display converted into some whole number of facsimile pels;

converting the facsimile pels into compressed data;

transmitting the compressed data to a buffer;

assigning a wait/proceed parameter to track the storage availability of the buffer;

checking the wait/proceed parameter to assure there is memory space within the buffer before the converter sends the compressed data to the buffer;

continuously transmitting the compressed data to the buffer when the wait/proceed parameter indicates that the buffer has available memory locations, the transmission continuing at a speed at which the dots of display can be converted;

stopping the flow of the compressed data when the wait/proceed parameter indicates the buffer is full, and continuing the transmission when the wait/proceed parameter indicates open memory locations;

continuously transmitting the compressed data from the buffer to the facsimile machine while the buffer has compressed data stored in it, the speed at which the compressed data are transmitted from the buffer to the facsimile machine not exceeding the facsimile machine's maximum transmission rate;

proceeding to a post-message phase when the wait/proceed parameter registers no more compressed data stored in the buffer; and transmitting the compressed data to a designated receive station.

* * * * *